United States Patent Office 3,445,078
Patented May 20, 1969

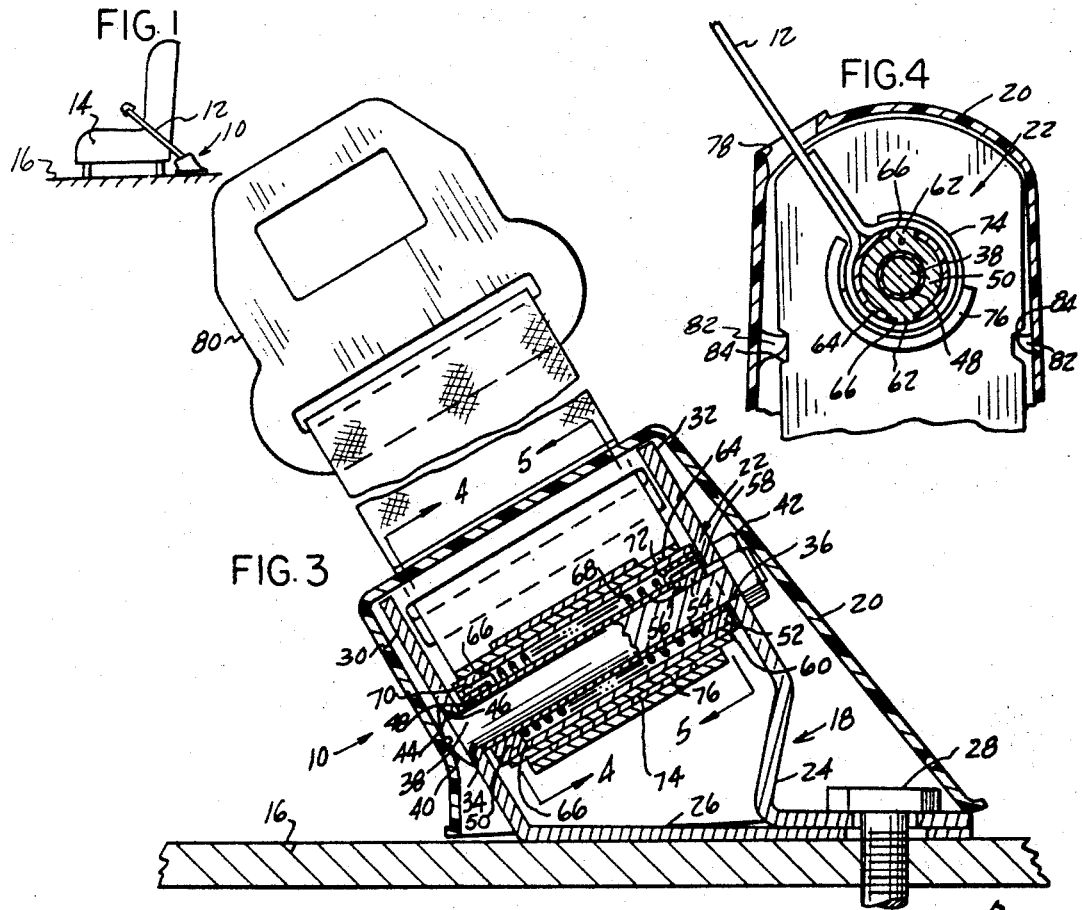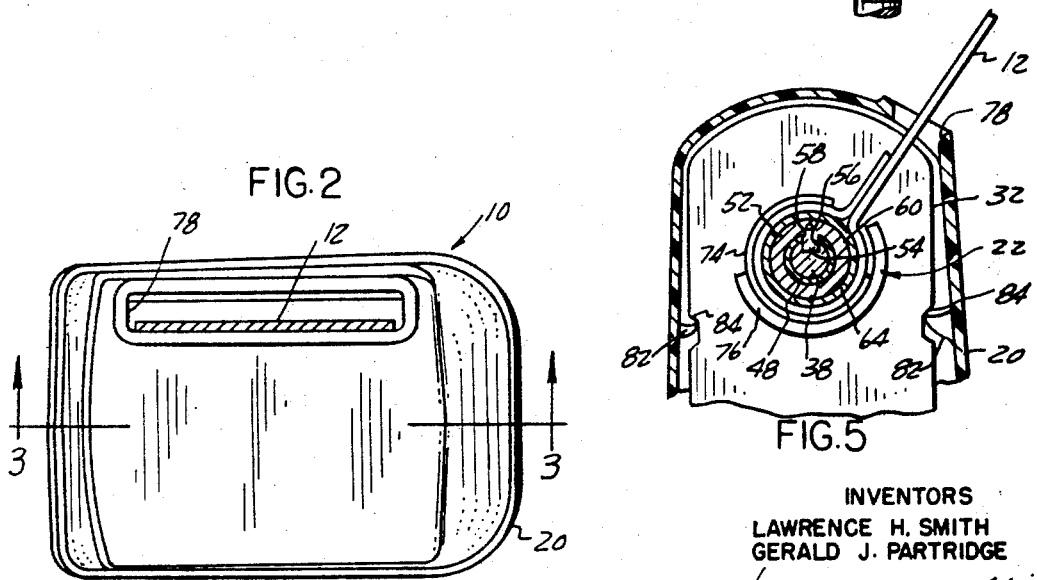
INVENTORS
LAWRENCE H. SMITH
GERALD J. PARTRIDGE

3,445,078
ROTARY SEAT BELT RETRACTOR
Lawrence H. Smith, Bloomfield Hills, and Gerald J. Partridge, Detroit, Mich., assignors to Jim Robbins Seat Belt Company, Royal Oak, Mich., a corporation of Delaware
Filed Mar. 23, 1967, Ser. No. 625,404
Int. Cl. B65h 75/48
U.S. Cl. 242—107     7 Claims

ABSTRACT OF THE DISCLOSURE

A rotary seat belt retracting device having a wind-up unit supported by a mounting bracket anchored to a fixed part of the vehicle. The wind-up unit comprises a rotatable metal wind-up drum, a non-rotatable metal sleeve supported on an anchor bolt fixed to the bracket and a pair of axially spaced plastic bushings supporting the drum for rotation around the sleeve. One bushing is attached to the drum and rotates around one end of the sleeve, while the other bushing is attached to the sleeve and provides a journal for the drum so that each bushing provides a plastic to metal bearing engagement between the drum and the sleeve. A coil spring surrounding the sleeve between the bushings has its opposite ends attached to the bushings to provide a torsional bias between the drum and the sleeve.

BACKGROUND OF THE INVENTION

Field of the invention

This invention relates to safety seat belt devices and more particularly to a rotary retracting device having an anchor pin for securing the terminal end of a seat belt to a fixed portion of the vehicle and wind-up means biasing the belt toward a stored wound-up position around the anchor pin.

Description of the prior art

Rotary seat belt retracting devices are widely employed in modern vehicles to maintain the seat belt in a stored position when it is not employed as a part of an occupant restraining system. In general these devices take the form of a rotary wind-up drum with a pre-tensioned spring-bias means acting on the drum so that a belt attached to the drum can be fully extended to an operating position in response to a pull-out force but is stored in a convenient roll when the pull-out force is released.

A major drawback in conventional rotary retracting devices is that the numerous component parts require a number of difficult and costly manufacturing and assembly operations. In addition, the large number of component parts in conventional retracting devices inherently increase the risk of a defective assembly in a high output manufacturing process.

Another drawback of conventional rotary seat belt retractors is that heretofore a device having a bearing arrangement providing a smooth withdrawal and retraction action has not been commercially feasible without relatively expensive bearing elements.

The preferred embodiment of the present invention obviates the aforementioned drawbacks of conventional retracting devices by providing a device having a relatively few, easily assembled components including inexpensive bearing elements providing a smooth wind-up and extension for the seat belt.

SUMMARY

The preferred embodiment of the present invention, which will be subsequently described in greater detail, comprises a mounting bracket arranged to a fixed part of the vehicle such as the floor. The bracket has a pair of spaced parallel side walls fixedly supporting an anchor pin about an axis transverse to the direction of movement of the seat belt. A metal cylindrical sleeve fixed to the anchor pin has ends defining the distance between the side walls. A cylindrical wind-up drum, having a length slightly shorter than the sleeve and accommodating the width of the seat belt, is supported for rotation around the sleeve by a pair of short, axially spaced apart, plastic bushing elements. The bushings, preferably of Delrin or nylon, provide a plastic to metal bearing engagement between the drum and the sleeve.

A cylindrical wind-up spring disposed between the bushings and around the sleeve is arranged to provide a torsional bias between the drum and the sleeve.

The lower terminal end of the belt is clamped to the pre-tensioned wind-up drum. The operating end of the belt extends through an opening in a housing enclosing the retracting device and carries a coupling section which is larger than the opening. The coupling section prevents the entire length of the belt from being withdrawn into the housing and provides the user convenient access to the belt end.

To assemble the retracting device, the terminal end of the belt is inserted through the opening of the housing and clamped to the wind-up drum. The drum, bushings, spring and sleeve are assembled as a unit and inserted between the side walls of the mounting bracket until the bore of the sleeve registers with the anchor pin apertures. The anchor pin is inserted into the sleeve a distance sufficient to lock the sleeve to the pin. The pin is rotated to pre-tension the spring and wind-up belt. The pin is then locked against rotation to the mounting bracket.

It is therefore an object of the present invention to provide an improved seat belt retracting device having a wind-up drum supported for rotation about an anchor pin by a pair of spaced apart bushing elements, the bushings providing a plastic to metal bearing engagement as the drum is rotated in response to forces producing extension and retraction of a belt clamped to the drum.

Another object of the present invention is to provide an improved rotary seat belt retracting device comprising an anchoring bracket having a pair of spaced apart side walls and a wind-up unit easily assembled with the anchoring bracket by an anchor pin, the wind-up unit consisting of a sleeve locked to the anchor pin, a wind-up drum having a length accommodating the width of the seat belt, a pair of axially spaced bushings supporting the drum for rotation about the sleeve, and a cylindrical, helical spring arranged to torsionally bias the drum relative to the sleeve.

Still further objects and advantages of the invention will readily occur to one skilled in the art to which the present invention pertains upon reference to the following detailed description.

DESCRIPTION OF THE DRAWING

The description refers to the accompanying drawing in which like reference characters refer to like parts throughout the several views and in which:

FIG. 1 is a view of a seat supported to the floor of a vehicle and having a retracting device illustrating the preferred embodiment of the invention;

FIG. 2 is an enlarged view looking generally downwards toward the retracting device illustrated in FIG. 1;

FIG. 3 is an elevational sectional view taken along lines 3—3 of FIG. 2 and showing the belt in a fully extended position;

FIG. 4 is a view taken along lines 4—4 of FIG. 3; and
FIG. 5 is a view taken along lines 5—5 of FIG. 3.

DESCRIPTION OF THE PREFERRED EMBODIMENT

Now referring to the drawings, FIG. 1 illustrates a preferred seat belt retracting device indicated at 10 for controlling the retraction of a seat belt 12 having a length permitting it to partially encircle the occupant of a conventional vehicle seat 14 mounted to the floor 16 of the vehicle.

The retractor unit 10 provides a dual function. First, it anchors the terminal end of the seat belt 12 to a fixed part of the vehicle to prevent relative displacement of the occupant of the seat 14 in the event of a sudden deceleration of the vehicle such as produced by a collision or the like. Secondly, the retractor 10 maintains the belt 12 in a stored position when the belt 12 is not employed as part of an occupant restraining system. Therefore, the retractor 10 is illustrated as preferably being attached to the floor 16, however, it can be attached to any other relatively fixed part of the vehicle such as the seat 14.

Referring to FIGS. 2 and 3, the retractor assembly 10 comprises a bracket 18, a housing 20 enclosing the bracket 18 and a wind-up unit generally indicated at 22 carried by the bracket and attached to the lower terminal end of the seat belt 12.

As best seen in FIG. 3, the anchoring bracket 18 preferably comprises a pair of bracket sections 24 and 26 having their lower end rigidly attached to the floor 16 of the vehicle by a threaded surface 28. The bracket sections 24 and 26 extend upwardly in the direction of movement of the belt 12 to form a pair of spaced parallel flanges 30 and 32.

A pair of axially aligned apertures 34 and 36 in the flange sections 30 and 32 provide means for supporting a metal anchor pin 38. The anchor pin 38 has an enlarged head portion 40 engaging the outer surface of the flange 30 and is threadably engaged with a nut 42 acting against the outer surface of the opposite flange 32. Thus the head 40 and the nut 42 provide means for drawing the flanges 30 and 32 toward one another in the assembly operation.

The anchor pin 38 is fixed against rotation with respect to the flange sections 30 and 32 preferably by a selected one of a series of 10 annularly spaced recesses 44 in flange 30 engaging an enlargement 46 formed under the head 40.

A metal, elongated sleeve 48 is carried by the pin 38 and has a length greater than the width of the belt 12. Preferably the length of the sleeve 48 is chosen so that as the flanges 30 and 32 are drawn toward one another by tightening the nut 42, the inner surfaces of the flange come into abutment with the extreme ends of the sleeve. Thus the length of the sleeve 48 defines a standard spacing between the inner surfaces of the flanges 30 and 32 and accommodates dimensional variations in assembly of the bracket sections 24 and 26.

A pair of axially spaced bushings 50 and 52 are mounted on the sleeve 48. As can best be seen in FIG. 5 the bushing 52 has a radially inwardly directed enlargement 54 engaged with a keyway 56 in the pin 38 and a slot 58 in the sleeve 48. Therefore, the bushing 52 is locked against rotation with respect to the sleeve 48 and the anchor pin 38. The bushing 52 also has an outer annular bearing surface 60.

As best seen in FIG. 4, the bushing 50 has a pair of diametrically arranged radial enlargements 62 and a bore rotatably engaged with the outer surface of the sleeve 48.

Referring back to FIG. 3, a tubular wind-up drum 64 supported to the bushings 50 and 52 has a pair of short longitudinal slots 66 engaged with the enlargements 62 of the bushing 50. Thus the wind-up drum 64 and the bushing 50 rotate as a unit about the sleeve 48. The inner surface of the opposite end of the wind-up drum 64 rotates about the outer surface of the bushing 52.

Preferably the bushings 50 and 52 are formed of a low-friction plastic material such as Delrin, nylon or the like so that they provide a low-friction rotating engagement between the wind-up drum 64 and the outer surface of the sleeve 48. The drum 64 is preferably made of steel, but it could as well be formed of a suitable plastic material. This plastic to metal bearing arrangement, in addition to its structural simplicity, provides a smooth rotation of the wind-up drum 64 about the sleeve 48.

A cylindrical helical spring 68 is wrapped around the sleeve 48 and between the bushings 50 and 52. The bushing 50 has an axially directed aperture engaging one end 70 of the spring 68 while the opposite bushing 52 has an axially directed aperture engaging the opposite end 72 of the spring. The spring 68 provides a torsional bias between the wind-up drum 64 and the sleeve 48.

Referring to FIGS. 4 and 5, the lower end of the belt 12 is looped around the wind-up drum 64 and fastened to itself by any suitable means such as stitching or the like. The looped end of the belt 12 is clamped to the drum 64 by a circumferentially resilient metallic clip 74. To improve the clamped engagement between the belt 12 and the drum 64, the outer surface of the drum 64 is preferably provided with a diamond knurl.

A generally semi-circular spacer 76 partially embraces the exterior surface of the clip 74. The spacer 76 reduces the eccentricity of the retracted belt produced by the bulge created by the stitched extreme end portion of the belt.

The belt 12 extends through an elongated opening 78 in the housing 20. The extended end of the belt 12 carries a conventional buckle section 80 having a width greater than the length of the opening 78 so that the belt cannot be completely withdrawn within the housing 20.

Referring to FIGS. 4 and 5, the housing 20 has a pair of inwardly directed projections 82 engageable with cut-out portions 84 of the flanges 30 and 32. The housing 20 is preferably formed of a suitable and attractive plastic material having a resiliency permitting it to be inserted over the brackets 30 and 32 with the sidewalls flexing outwardly sufficient to permit the projections 82 to slip into engagement with the cut-out portions 84.

The wind-up unit is normally assembled in a separate step with the sleeve 48, the wind-up drum 64, the bushings 50 and 52 and the spring-biased member 68 assembled as a unit with the belt 12 clamped to the drum 64. The unit is inserted between the flanges 30 and 32 until the bore of the sleeve 48 registers with the apertures 34 and 36. The pin 38 is inserted through the bore of the sleeve 48 until bushing 52 is engaged with the keyway 56. The pin 38 is rotated to wind the belt and pretension spring 68. The pin 38 is then fully inserted so that the enlargement 46 is seated in a selected recess 44 and the threaded end of the pin is joined with nut 42. The nut 42 is tightened until the inner surface of the flanges 30 and 32 come into abutment with the ends of the sleeve 48. The buckle section 80 prevents the free end of the belt 12 from being entirely withdrawn into the housing 20 and permits the occupant of the seat 14 to easily grasp the belt 12.

Thus, it is to be understood that we have described an improved rotary seat belt retracting device comprising a relatively few components adapted for easy assembly in a high output assembly line and having plastic to metal bearing surfaces providing a smooth withdrawal and retraction action.

We claim:
1. A seat belt device, comprising:
 (a) an elongated seat belt;
 (b) a support adapted for attachment to a vehicle, and provided with first and second parallel walls that are fixed with respect to one another and spaced from one another a distance greater than the width of the belt, the first wall having an opening therein;
 (c) an elongated anchor pin having one end supported in the opening of the first wall and its other end supported by the second wall so as to span the two walls;
 (d) an elongated sleeve having a length which is greater than the width of the belt and being so formed as to allow passage of the pin through its opposite longitudinal ends but to be impassable through the opening in the first wall, said sleeve being mounted substantially concentrically with respect to the longitudinal axis of the pin with its ends in abutment with the opposed sides of the walls;

(e) a first bushing mounted on said sleeve between the walls of the support and connected through the sleeve to the pin so as to be fixed against rotation about the longitudinal axis of the pin;

(f) a second bushing mounted on said sleeve between the walls of the support for slidable motion about the axis of said pin in a first direction of rotation and in the opposite, second direction of rotation;

(g) a spring connecting the first bushing and the second bushing to urge the second bushing toward rotation in the first direction;

(h) an elongated drum having a tubular wall with a length at least as long as the width of the belt, but shorter than the sleeve, mounted on the first and second bushings between the walls of the support so as to be concentric with the longitudinal axis of said pin, being connected to the second bushing to rotate with the second bushing, and being rotatable about the first bushing so that the drum and the second bushing are movable by the spring in the first direction of rotation;

(i) means for connecting the belt to the drum such that the belt is wound on the drum as the drum is rotated in its first direction of rotation and unwound therefrom as the drum is rotated in its second direction of rotation; and (j) fastener means on the pin engageable with the walls of the support to fix the pin against motion with respect to the support.

2. A seat belt device as defined in claim 1, in which the pin has a length which is greater than the distance between the walls of the support, and the second wall has an opening aligned with the opening in the first wall to allow the passage of one end of the pin through both walls.

3. A seat belt device as defined in claim 1, in which the second wall of the support has an opening aligned with the opening in the first wall, both ends of the pin are supported in the aligned openings in the two walls, and including means on one end of the pin engageable with complementary means in the wall in which said one end is supported to lock the pin against rotation with respect to the walls.

4. A seat belt device as defined in claim 3, in which said fastener means comprise one end of the pin having a head engaged with the outer side of the wall to which said one end is supported and so formed as to be impassable through the opening in which it is supported, and a nut fastened on the other end of the pin and being engaged with its supporting wall such that the head and the nut cooperate to prevent motion of the walls away from the ends of the sleeve.

5. A seat belt device as defined in claim 4, in which the two bushings are longitudinally spaced with respect to the axis of the sleeve, and the spring is disposed within the drum between the two bushings with its ends connected to the bushings.

6. A seat belt device as defined in claim 1, wherein said first and second bushings are each formed of a plastic material, and said sleeve and said drum are of metal.

7. A seat belt device as defined in claim 1, wherein said spring is pretensioned so that said seat belt is normally biased toward its wound position around said drum.

References Cited

UNITED STATES PATENTS

| 2,393,511 | 1/1946 | Beede | 242—107.6 |
| 2,725,097 | 11/1955 | Thoreson | 242—107.2 X |
| 3,251,627 | 5/1966 | Fisher | 242—107 X |
| 3,289,971 | 12/1966 | Turek et al. | 242—107.11 |
| 3,311,409 | 3/1967 | Fisher | 297—388 |
| 3,325,212 | 6/1967 | Dillender | 242—107.4 X |

WILLIAM S. BURDEN, *Primary Examiner.*